United States Patent

Matsushima et al.

[11] Patent Number: 5,879,767
[45] Date of Patent: Mar. 9, 1999

[54] AIR BAG

[75] Inventors: Yosuke Matsushima, Sagamihara; Yasuhiro Iino, Kodaira; Shinichi Toyosawa; Takeshi Kimura, both of Tokorozawa; Yoshihide Fukahori, Hachiouji; Akeshi Noda, Yamato, all of Japan

[73] Assignee: Bridgestone Corporation, Tokyo, Japan

[21] Appl. No.: 703,790

[22] Filed: Aug. 27, 1996

Related U.S. Application Data

[62] Division of Ser. No. 295,483, Aug. 25, 1994, Pat. No. 5,618,595, which is a continuation of Ser. No. 810,867, Dec. 20, 1991, abandoned.

[30] Foreign Application Priority Data

Dec. 27, 1990 [JP] Japan .................................. 2-407989

[51] Int. Cl.⁶ ............................. B60R 21/16; B29D 22/00
[52] U.S. Cl. .................... 428/35.2; 428/35.4; 428/35.5; 428/36.1; 428/225; 428/373; 428/374; 428/902; 280/728.1; 280/743.2; 156/272.2; 156/273.7; 264/500; 264/513
[58] Field of Search .................. 428/35.2, 35.5, 428/35.4, 36.1; 280/728.1, 743.2, 373, 374, 296, 902, 193, 114; 156/272.2, 273.7; 264/500, 513

[56] References Cited

U.S. PATENT DOCUMENTS

| | | | |
|---|---|---|---|
| 3,756,620 | 9/1973 | Radke | 280/743.2 |
| 3,900,210 | 8/1975 | Lohr et al. | 280/743.1 |
| 3,970,328 | 7/1976 | Wallsten | 280/743.1 |
| 4,449,728 | 5/1984 | Pilatzki | 280/743 A |
| 4,467,839 | 8/1984 | Westhead | 139/383 A |
| 4,668,545 | 5/1987 | Lowe | 428/35.1 |
| 4,800,113 | 1/1989 | O'Connor | 428/374 |
| 4,830,401 | 5/1989 | Honda | 280/743 A |
| 4,830,904 | 5/1989 | Gessner et al. | 428/374 |
| 4,921,735 | 5/1990 | Blach | 428/34.9 |
| 4,957,804 | 9/1990 | Hendrix et al. | 428/373 |
| 4,977,016 | 12/1990 | Thornton et al. | 428/36.1 |
| 4,980,227 | 12/1990 | Sekiguchi et al. | 442/3 |
| 4,996,099 | 2/1991 | Cooke et al. | 428/373 |
| 5,014,755 | 5/1991 | Bompard et al. | 428/373 |
| 5,044,663 | 9/1991 | Seizert | 280/743 A |
| 5,078,423 | 1/1992 | Fujita | 280/743 A |
| 5,087,071 | 2/1992 | Wallner et al. | 280/743.1 |
| 5,091,243 | 2/1992 | Tolbert et al. | 428/373 |
| 5,618,595 | 4/1997 | Matsushima et al. | 428/35.2 |

FOREIGN PATENT DOCUMENTS

| | | |
|---|---|---|
| 4142326 | 6/1993 | Germany . |
| 122751 | 5/1989 | Japan . |
| 248943 | 11/1991 | Japan . |
| 1507152 | 4/1978 | United Kingdom . |
| 2244496 | 12/1988 | United Kingdom . |
| 2244496 | 4/1991 | United Kingdom . |
| 9212028 | 7/1992 | WIPO . |

*Primary Examiner*—Rena L. Dye
*Attorney, Agent, or Firm*—Sughrue, Mion, Zinn, Macpeak & Seas, PLLC

[57] ABSTRACT

A first air bag comprises an upper cloth and a lower cloth, the peripheries of the both cloths being connected, characterized in that the upper cloth consists of an airtight sheet obtained by weaving a composite fiber composed of a filament core and a thermoplastic polymer bonded thereto which has a melting point lower than that of said filament core, and then fusing said thermoplastic polymer so that the surface of said upper cloth has a continuous thermoplastic polymer layer. A second air bag consists of a membranous material having a breaking extension of 100% or more. A third air bag comprises an elastomer body and a shape-retaining member partially attached to the elastomer body, said member being composed of elastic fibers or threads and high-modulus fibers.

14 Claims, 5 Drawing Sheets

ND SIDE OF WARRIOR

AIR BAG

This is a divisional of application Ser. No. 08/295,483 filed Aug. 25, 1994; now U.S. Pat. No. 5,618,595 which is a File Wrapper Continuation of Ser. No. 07/810,867, filed Dec. 20, 1991 now abandoned.

BACKGROUND OF THE INVENTION

1. Field of the Invention

The present invention relates to an air bag, particularly to an air bag which is able to securely protect drivers and passengers, and can be compacted and manufactured at a low cost.

2. Prior Art

An air bag system is proposed as a safety device in a collision of various transportation, vehicles especially for collision of automotive vehicles, and it is practically used.

Air bags generally used at present comprise so-called rubber-coated cloths made by coating a fabric of nylon fibers (840 denier) with rubber such as chloroprene.

To manufacture the above rubber-coated air bags, there is the disadvantage that the process is complicated because it is necessary to sew a circular upper cloth and a lower cloth. It is necessary to and also sew straps for inflating the air bag into the best shape on them, and then coat the sewn portion with rubber. It is also necessary to fold the air bag to store it in a module. Therefore, the air-bag receptable requires a large space or area, impairing visibility.

SUMMARY OF THE INVENTION

The present invention is made to solve the above problems and it is an object of the present invention to provide an air bag which is able to securely protect drivers and passengers, and can be compacted and manufactured at a low cost by simplifying the air bag manufacturing process.

According to the first aspect of the present invention, there is provided an air bag comprising an upper cloth and a lower cloth, the peripheries of the both cloths being connected, characterized in that the upper cloth consists of an airtight sheet obtained by weaving composite fibers composed of a filament core and a thermoplastic polymer bonded thereto which has a melting point lower than that of said filament core, and then fusing said thermoplastic polymer so that the surface of said upper cloth has a continuous thermoplastic polymer layer.

The air bag of the first aspect of the present invention is made by connecting the peripheries of the upper cloth and the lower cloth together. The upper cloth comprises the sheet made by weaving composite fibers consisting of the filament core and the thermoplastic polymer having a melting point lower than that of the filament core and then fusing the polymer.

The sheet according to the air bag of the first aspect of the present invention does not require any rubber coating and it allows the upper and lower cloths to be thermally fused easily without sewing them together. Therefore, the manufacturing process can be simplified and the manufacturing cost can be decreased. Moreover, space can be saved because the air bag is smoothly stored in the module.

Also, the safety, when the air bag is inflated, is high because the upper cloth can be made of a flexible material.

According to the second aspect of the present invention, there is provided an air bag consisting of a membranous material having a breaking extension of 100% or more.

The air bag of the second aspect of the present invention is composed of a highly elastic membrane having a breaking extension of 100% or more and prepared by forming the membrane into a bag-like shape. Therefore, even when the inflated air bag hits against the face of a vehicle driver, the air bag causes no harm to his face.

Actually, any conventional air bag is composed of such material having poor elasticity, and thus, the inner pressure of the inflated air bag quickly and sharply changes when the inflated air bag hits against the face of a vehicle driver. On the other hand, since the air bag of the present invention is composed of a highly elastic membranous material and therefore has a sufficient elasticity, the inner pressure slowly changes. As a result, the air bag system of the present invention can securely protect the driver's body independent of the driver's physical type and the distance between the driver's body and the steering wheel storing the air-bag module at the time of the occurrence of collision. Accordingly, the air bag system design is not so restricted.

Furthermore, the air bag according to the present invention can easily be manufactured by employing a single-stage molding process or by fusing, vulcanizing or bonding the peripheries of a pair of sheets together. Since no sew line is provided, such a conventional process for sealing the sew line with rubber is no longer required, whereby the production process can be simplified, the production efficiency can be promoted, and the production cost can be lowered.

The air bag of the present invention has a lighter weight than any of the conventional air bags, and therefore, it can smoothly be stored in the module, thus saving space. In particular, in the event that an emergency arises, the air bag can be inflated smoothly and properly.

According to the third aspect of the present invention, there is provided an air bag comprising an elastomer body and a shape-retaining member partially attached to the elastomer body, said member being composed of elastic fibers or threads and high-modulus fibers, and said elastomer body preferably having a higher elongation than that of said elastic fibers.

The air bag of the third aspect of the present invention can easily be inflated into a predetermined shape as designed because the elastic fibers or threads of the shape-retaining member can effectively execute and facilitate the deployment and inflating performance of the air bag and the high-modulus fibers of the shape-retaining member can precisely retain the shape of the air bag.

More specifically, as shown in FIG. 6 indicating a stress-strain curve of a specific fiber or thread which is detailed explained later, the high-modulus fiber can restrain the stretch of the elastic fiber or thread at the region beyond the point "a", thereby exerting shape retention.

It should be noted that X in FIG. 6 shows the performance of an air bag in a region in which the influence of elastic fibers or threads is predominant and Y shows the performance of an air bag in a region in which the influence of high-modulus fibers is predominant.

Since the air bag of the third aspect of the present invention incorporates the shape-retaining member, the air bag dispenses with the conventional straps otherwise needed for properly shaping the air bag on the way of inflation. Furthermore, since the air bag of the present invention has no sew line, it is no longer required to seal the sew line with rubber. In consequence, compared to the prior arts, materials and production steps required for manufacturing an air bag can be advantageously saved, resulting in a significantly decreased production cost.

In particular, since the air bag of the present invention is highly elastic, the air bag does not harm a vehicle driver's face even when the inflated air bag hits against his face.

Due to poor elasticity of the component material of any conventional air bags, the inner pressure of the inflated air bag quickly and sharply changes. In contrast, because of elasticity of the air bag of the invention, the inner pressure mildly changes. As the result, the air bag of the invention securely protects the driver's body under an optimal condition independent of the driver's physical type and the distance between the driver's body and the steering wheel storing the air-bag module at the moment of the occurrence of collision.

In this case, a design staff can precisely design a three-dimensional shape of the air bag ideally suited for optional posture and position of the vehicle driver by properly designing the shape-retaining member, more particularly, by precisely setting a proportion of the elastic fibers and the high-modulus fibers, the width, length, and set position of the special tape, special fabrics, elastic fabric and high-modulus fabric which are explained in detail later. It is also possible for a design staff to precisely design the air bag to securely prevent the driver's face from coming into contact with the high-modulus fibers on the way of causing the air bag to contract its shape.

Furthermore, the air bag of the invention has a lighter weight than any conventional air bags, and can compactly be stored in the module of the steering wheel to effectively save space. Moreover, the air bag of the invention very quickly and properly deploys and inflates itself.

DETAILED DESCRIPTION OF THE PREFERRED EMBODIMENT

The first aspect of the present invention is described below in detail according to FIGS. 1 to 5.

Figure 1:
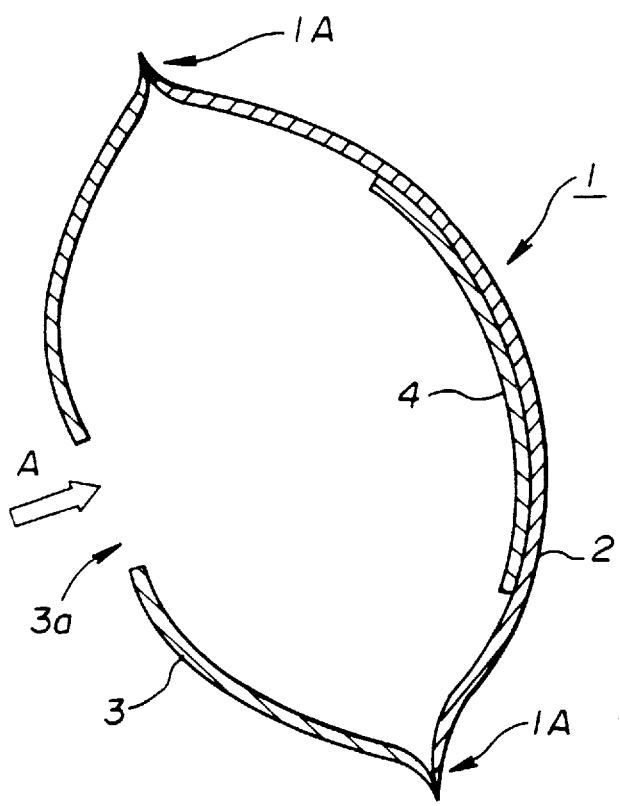
FIG. 1 is a sectional view of one embodiment of an air bag according to the first aspect of the present invention.
Figure 2:
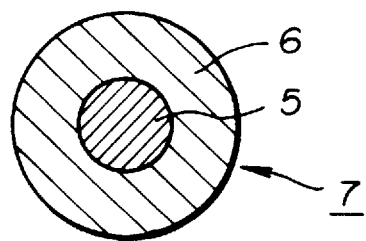
FIG. 2 is a sectional view of one embodiment of a composite fiber according to the first aspect of the present invention.
Figure 3:
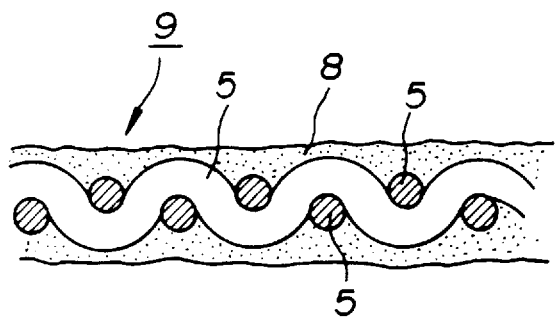
FIG. 3 is a sectional view of one embodiment of a sheet according to the first aspect of the present invention.
Figure 4:
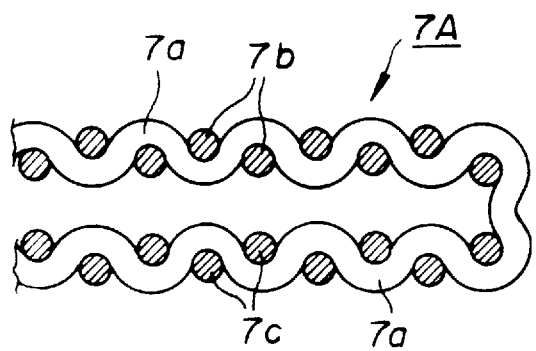
FIG. 4 is a sectional view of one embodiment of a fabric according to the first aspect of the present invention.
Figure 5:
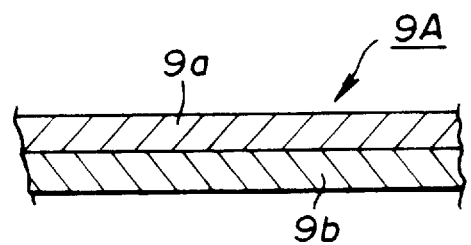
FIG. 5 is a sectional view of another embodiment of a sheet according to the first aspect of the present invention.

FIG. 1 is a sectional view of one embodiment of an air bag in its inflated state according to the first aspect of the present invention. FIG. 2 is a sectional view of an embodiment of a composite fiber. FIG. 3 is a sectional view of an embodiment of a sheet. FIGS. 4 and 5 are sectional views of the other embodiments of fabric and sheet.

The air bag of the first aspect of the present invention comprises an upper cloth and a lower cloth, the peripheries of the both cloths being connected, characterized in that the upper cloth consists of an airtight sheet obtained by weaving composite fibers composed of a filament core and a thermoplastic polymer bonded thereto which has a melting point lower than that of said filament core, and then fusing said thermoplastic polymer so that the surface of said upper cloth has a continuous thermoplastic polymer layer.

As shown in FIG. 1, an air bag 1 of this embodiment comprises an upper cloth 2, a lower cloth 3 having an inflator insertion opening 3a at its center and a reinforcement cloth 4 connected at approximately central portion on the back of the upper cloth 2. Both the upper and lower cloths are substantially circular and the peripheries thereof are connected together.

In this embodiment, each of the upper cloth 2, lower cloth 3, and reinforcement cloth 4 comprises a sheet made by weaving composite fibers consisting of a filament core and a thermoplastic polymer bonded to the filament core and having a melting point lower than that of the filament core and then fusing the low-melting polymer.

The composite fiber according to the present invention may be a sheath-and-core-type composite fiber 7 in which a filament core 5 is covered with a low-melting polymer or sheath 6 as shown in FIG. 2. In this case, the filament core 5 may be eccentric.

It is also possible to use a side-by-side-type composite fiber in which a filament core and a low-melting polymer are bonded together in parallel like bimetal.

Examples of the core materials include polyamide fibers, polyester fibers, and high-elastic fibers such as aramid fibers, aromatic polyester fibers, and ultra-high-molecular-weight polyethylene fibers.

The low-melting polymers include polyethylene, modified (low-melting) polyester, polyurethane, and ethylene-vinyl acetate copolymer. If the difference of melting point between low-melting polymer and the core is small, the core may shrink upon fusing of the fabric to be mentioned later. Therefore, it is desired that the polymer has a melting point much lower than that of the core so that the difference of melting point between the polymer and the core is 100° C. or more, preferably 150° C. or more.

For example, it is possible to use a composite fiber consisting of polyester core (melting point of 200° to 250° C.) and modified polyester fiber (melting point of 90° to 130° C.).

By heating and, if necessary, pressing the fabric obtained by weaving the above composite fibers to fuse the low-melting polymer of the composite fibers of the fabric, the low-melting polymer melted enters the gap between cores and therefore, as shown in FIG. 3, the airtight sheet 9 is obtained in which the surface, back, and gap of the core 5 are filled with the continuous low-melting polymer layer 8 formed through melting and then solidifying. Heating or heat pressing may be carried out simultaneously with punching the fabric to obtain the sheet 9.

In the present invention, the sheet 9 with a desired shape for upper cloth, lower cloth, or reinforcement cloth can easily and efficiently be obtained by heating or heat-pressing the fabric prepared by weaving the above composite fiber and punching it.

The air bag 1 shown in FIG. 1 is prepared by attaching the reinforcement cloth 4 on the predetermined portion of the upper cloth 2 by fusing and then overlapping the upper cloth 2 and the lower cloth 3 to fuse the peripheries thereof together.

The air bag shown in FIG. 1 is an embodiment of the present invention. The present invention is not restricted thereto. The reinforcement cloth is not always necessary. It is also possible to use a sheet 9A shown in FIG. 5 prepared by thermally pressing a two-layer fabric 7A consisting of wefts 7a made of normal fibers, upper-layer warps 7b made of composite fibers, and lower-layer warps 7c made of normal fibers as shown in FIG. 4. The thus obtained sheet 9A has a layer 9a consisting of the thermoplastic covering the wefts 7a formed through melting and then solidifying and a normal fiber layer 9b as-shown in FIG. 5.

Especially, an air bag in which the low-melting polymer of the upper sheet is a flexible material such as polyethylene, ethylene-vinyl acetate copolymer or polyurethane and therefore the surface of the air bag is constructed therefrom would hardly damage drivers and passengers even if the air bag hits the face or head of drivers and passengers.

When a fabric made of normal fibers or composite fibers without fusing is used for the lower cloth, an air bag has gas permeability because it is possible to properly leak the gas (shown by the arrow A in FIG. 1) from the inflater through the networks of the lower cloth and therefore does not require the formation of vent holes. When a fabric made of normal fibers is used for the lower cloth, it is preferable to put a thermally fusable film between the upper and lower cloths along their peripheries in order to thermally bond them together.

The air bag of the second aspect of the present invention is composed of a membranous material which is capable of elongating by 100% or more, preferably 100 to 1200%, more preferably 100 to 500% at the moment of its breakage. If the membranous material has a breaking extension of less than 100%, the object of the present invention cannot be achieved.

The membranous materials having a breaking extension of 100% or more may be selected from thermoplastic elastomer membranes and thermosetting elastomer membranes.

Examples of thermoplastic elastomers include polyurethane elastomer, polystyrene elastomer, polyolefin elastomer, polyester elastomer, and polyamide elastomer. Among them, polyurethane elastomer is preferred from the viewpoint of mechanical property and thermal resistance.

Examples of thermosetting elastomer include natural rubber, butadiene rubber, styrene-butadiene rubber, chloroprene rubber, nitrile rubber, butyl rubber, ethylenepropylene rubber, chloro-sulfonated polyethylene rubber, acrylic rubber, epichlorohydrin rubber, silicone rubber, fluorinated rubber and polyurethane rubber.

The air bag according to the second aspect of the present invention can be prepared by the following methods using such an elastic membrane.

The First Manufacturing Method:

Unlike the conventional methods, the first manufacturing method shapes a seamless bag by employing a single stage molding process without any sewing process. More specifically, any of those manufacturing processes A, B, and C may be employed.

Process A

At least one kind of membranes of thermoplastic elastomers or thermosetting elastomers is formed into an air bag having a thickness of 10 to 700 μm, preferably 100 to 500 μm by a blow molding process. In this case, it is possible to form the air bag into a laminated structure by using two or more of thermoplastic elastomer films or thermosetting elastomer films. The air bag having a laminated structure consisting of two or more of the membranes has a peculiar characteristic since the physical properties of the inside and outside of the air bag are different each other. In particular, an air bag having different thermal resistant properties at its inside and outside can be obtained.

Process B

By an injection molding process, thermoplastic elastomer or thermosetting elastomer is shaped into an air bag having a thickness of 10 to 700 μm, preferably 100 to 500 μm.

Process C This process is carried out by initially enveloping an air bag-shaped mold with an air bag-shaped stretch fabric or knit composed of elastic fibers having a breaking extension of 100% or more so that an aperture or hole is formed to a part of the stretch fabric or knit. Next, the stretch fabric or knit enveloping the mold is immersed in a liquid containing thermoplastic elastomer or thermosetting elastomer capable of forming a film having a breaking extension of 100% or more, and then the elastomer-impregnated fabric or knit is thoroughly dried. The aperture or hole is again expanded before removing the completed air bag from the mold.

The stretch fabrics may be ones composed of elastic fibers such as elastic polyurethane fibers having a breaking extension of 100% or more, preferably substantially the same breaking extension as that of thermoplastic elastomer to be impregnated to the fabric or knit and to compose the matrix of the air bag. The stretch knits may be composed of nylon or polyester fibers, nylon fibers being preferred from the viewpoint of flexibility.

The liquids are any solutions, emulsions and dispersions containing thermoplastic elastomer or thermosetting elastomer.

The Second Manufacturing Method

Unlike the conventional methods, the second manufacturing method shapes an air bag by joining a pair of sheets without any sewing process. In the method, a sheet having a thickness of 10 to 700 m, preferably 100 to 500 μm is prepared by sheet extruding or inflation extruding at least one kind of thermoplastic or thermosetting elastomer. Next, the extruded sheet is punched into a circular or other shape, and then the peripheries of two sheets thus obtained are fused, vulcanized or bonded together to form an air bag. It is possible to use a composite or laminated sheet consisting of two or more of thermoplastic or thermosetting elastomer films. It is also possible to use a thermoplastic or thermosetting elastic sheet reinforced with a stretch fabric or knit described in process C of the first manufacturing method.

The air bag of the invention may be one provided with a form-retaining member which regulates the direction of the expansion of the air bag and retains the optimal shape of the inflated air bag. The air bag of this type may be manufactured by the following methods:

(1) A method which connects the periphery of an inflator inserting-hole in an air bag and the inner center surface portion of the air bag which comes into contact with a driver body by means of a plurality of suspending strings by fusing, vulcanizing or bonding.

(2) A method which integrally and partially attaches a rib to the air bag by fusing, vulcanizing, bonding or injection molding.

(3) A method which crosslinks an optional part of air bag made of thermoplastic elastomer by means of electron beams thereby decreasing elongation of the electron beam-irradiated part and increasing modulus of elasticity of the part to a level higher than that of the remaining parts.

The suspending string or rib is one capable of adhering to the air bag by fusing, vulcanizing or bonding, and may be made by any elastomer sheets or those sheets reinforced by a fabric.

The air bag of the third aspect of the present invention comprises an elastomer body formed by an elastic film or films and a shape-retaining member partially attached to the elastomer body.

The shape-retaining member is composed of a special fabric made of 10 to 90% by weight, preferably 20 to 80% by weight of elastic fibers or threads and 90 to 10% by weight, preferably 80 to 20% by weight of high-modulus fibers and may have the following constructions.

(1) Special tape or fabric composed of elastic fibers or threads and fibers having a high modulus of elasticity.

1-a

Figure 7:
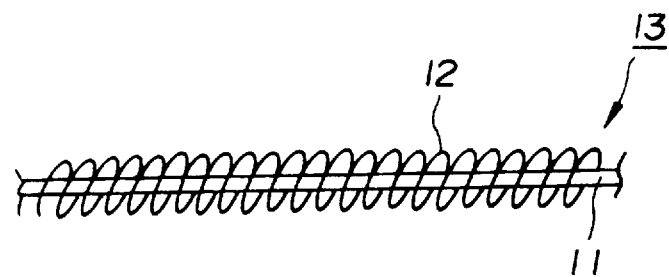
FIG. 7 is a front view of one embodiment of a special fiber according to the third aspect of the present invention.

A special tape I-a which comprises, as shown in FIG. 7, special fibers obtained by spirally winding one or more of high-modulus fibers 12 to a core 11 composed of elastic fibers or threads. A plurality of the specific fibers 3 are combined into one to obtain a tape. In this case, it is required that the combined special fibers 3 are prevented from disintegrating.

1-b

A special fabric I-b which is obtained by weaving those special fibers 3. The special fabric 1-b may be of tape shape.

(2) Special fabric composed of elastic fibers or threads and fibers having a high modulus of elasticity.

2-a

Figure 8:
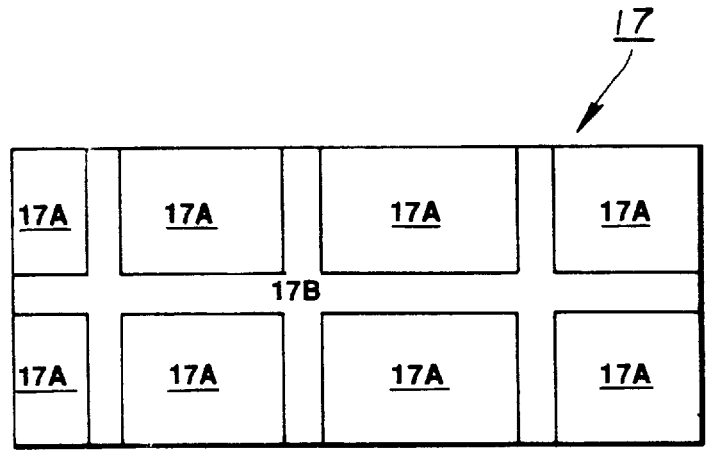
FIG. 8 is a plan view of one embodiment of a special fabric according to the third aspect of the present invention.

A special fabric II-a which consists of portions 17A consisting essentially of elastic fibers or threads and the remaining portions 17B consisting essentially of high-modulus fibers as shown in FIG. 8.

2-b

A special fabric II-b having a laminating structure which comprises an elastic fabric consisting essentially of elastic fibers or threads laminated with a high-modules fabric consisting essentially of high-modulus fibers. In this case, at least a part of the elastic fabric should superficially emerge from the high-modulus fabric.

The elastic fibers or threads may be thermoplastic or thermosetting fibers or rubber threads, preferably having a breaking extension of 50% or more, particularly 50 to 1200%, more particularly 100 to 500%. Examples of the elastic fibers or threads include elastic polyurethane fibers, crimped fibers and rubber threads.

The high-modulus fibers should have a low elongation. Examples of the high-modulus fibers include aramid fibers, aromatic polyester fibers, ultra-high-molecular-weight polyethylene fibers.

The body of an air bag according to the third aspect of the present invention is composed of an elastomer film. The elastomer is a thermoplastic or thermosetting elastomer preferably having a higher elasticity than that of the above-described elastic fibers.

As thermosetting elastomers, there is preferably used natural rubber, butadiene rubber, styrene-butadiene rubber, chloroprene rubber, nitrile rubber, butyl rubber, ethylene-propylene rubber, chloro-sulfonated polyethylene rubber, acrylic rubber, epichlorohydrin rubber, silicone rubber, fluorinated rubber, or polyurethane rubber.

As thermoplastic elastomers, there is preferably used polyurethane elastomer, polystyrene elastomer, polyolefin elastomer, polyester elastomer, or polyamide elastomer. Of these, polyurethane elastomer is preferred from the viewpoint of mechanical property and thermal resistance.

Taking a light weight, inflating characteristic, and strength of the air bag into consideration, it is desired that the elastomer film preferably has a thickness of 10 to 3,000 $\mu$m, particularly 100 to 1,000 $\mu$m and a breaking extension of from 150 to 1,500%, particularly from 500 to 1,200%.

Figure 9:
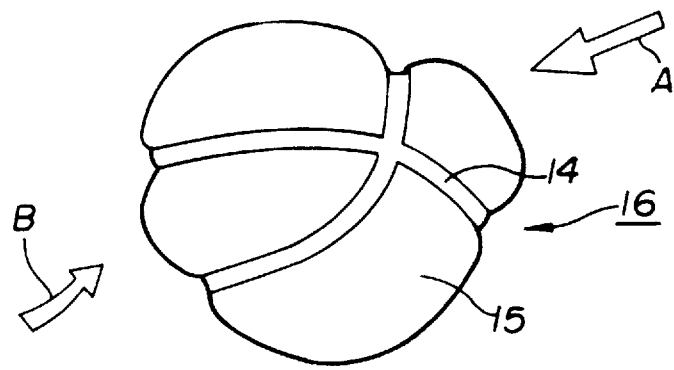
FIG. 9 to 12 are respectively perspective views of various embodiments of inflated air bags according to the third aspect of the present invention.

Although there is no restriction on the method of manufacturing the air bag, the air bag can easily be manufactured by partially laminating the shape-retaining member to an elastomer film by hot pressing process to obtain an integrated sheet, overlapping a pair of the integrated sheets and then fusing, vulcanizing or bonding the peripheries thereof, as shown in FIG. 9. In FIG. 9, numeral 14 designates the special tape I-a or special fabric I-b, II-a or II-b.

Figure 6:
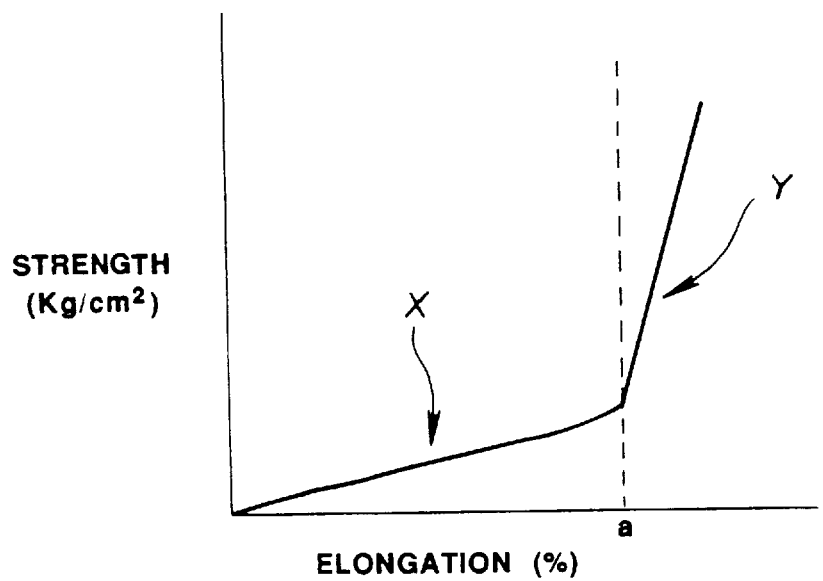
FIG. 6 is a stress and strain curve of a special fiber according to the third aspect of the present invention.

It is necessary to form or design the shape-retaining member so that the high-modulus fibers can effectively exert their effect and restrain the stretch of the elastic fibers or threads at the region beyond the point "a" in FIG. 6, and an air bag can have a predetermined inflated shape as designed at the region beyond the point "a".

Examples of the present invention are given below by way of illustration and not by way of limitation.

EXAMPLE 1

An upper cloth consisting of a substantially circular airtight sheet with a diameter of 75 cm and a thickness of 0.4 mm was manufactured by forming a fabric made of composite fibers consisting of polyester core (melting point of 230° C.) and modified-polyester sheath (melting point of 110° C.) covering the core, and thermally fusing the fabric at 150° C. and punching it. Similarly, a reinforcement cloth consisting of a substantially circular airtight sheet with a diameter of 16 cm and a thickness of 0.4 mm was manufactured and thermally fused on approximately the central portion of the upper cloth.

Also, a lower cloth with a diameter of 75 cm and a thickness of 0.4 mm having an inflater insertion opening was manufactured by punching a fabric obtained in the same manner as above.

Thus, the air bag shown in FIG. 1 was obtained by over-lapping the lower and upper cloths and thermally pressing and fusing the peripheries of them.

EXAMPLE 2

The air bag shown in FIG. 1 was obtained by placing a thermally fusible modified polyester film (melting point of 110° C.) having an outer diameter of 75 cm, an inner diameter of 72 cm, and a thickness of 0.4 mm between the upper cloth having a diameter of 75 cm and a thickness of 0.4 mm manufactured in Example 1 and a lower cloth consisting of polyester fabric having a diameter of 75 cm and a thickness of 0.4 mm, and thermally pressing and fusing the peripheries at 140° C.

The air bags manufactured for Examples 1 and 2 were superior in the inflating and storing characteristics and easily manufactured.

EXAMPLE 3

An air bag having a thickness of 300 $\mu$m was prepared by blow molding an ether-type thermoplastic polyurethane elastomer having a JIS A-Hardness of 85 and a breaking extension of 500%. The obtained air bag had 270 grams of net weight.

EXAMPLE 4

Using the same thermoplastic polyurethane elastomer as in Example 3, a sheet having a thickness of 300 $\mu$m was prepared by an extrusion molding process. The sheet was punched into two circular sheet each having a diameter of 750 mm. One circular sheet was further punched to provide an aperture or hole for installing an inflater and a vent hole.

Next, both of the circular sheets were overlapped to fuse the external peripheral portions thereof with 30 mm wide by a hot pressing process at 150° C., thereby obtaining an air bag having 290 grams of net weight.

EXAMPLE 5

Using the same thermoplastic polyurethane elastomer as in Example 3, sheets having a thickness of 150 $\mu$m were prepared by an extrusion molding process. Next, the two thermoplastic polyurethane sheets were laminated on both surfaces of elastic polyurethane fabric having a elasticity of 500% and then integrally fused together by means of a roll heated at 150° C. Thereafter, an air bag having 310 grams of net weight was prepared by using the integral sheets in the same manner as in Example 4.

EXAMPLE 6

An air bag-shaped mold was enveloped with an elastic polyurethane knit prepared by knitting the fibers into an air-bag shape. Next, the elastic polyurethane knit on the mold was immersed in a solution containing 40% conc. calcium nitrate and methanol and then immersed in a latex of chloroprene rubber capable of forming a film having breaking extension of 700%. The latex-impregnated knit on the mold was dried and vulcanized at 70° C. for 120 minutes in a drying unit before removing the knit from the mold. The air bag had obtained 300 $\mu$m of thickness and 310 grams of net weight.

EXAMPLE 7

A special tape I was prepared by spirally winding a high-modulus aramid fiber on an elastic polyurethane fiber core to prepare a special fiber and combining a plurality of the special fibers into one. Next, the special tape was laminated to an ether-type thermoplastic polyurethane elastomer film having a thickness of 300 $\mu$m by a hot press molding process to prepare a pair of laminated sheets. Finally, the peripheries of these sheets were fused to obtain an air bag 16 conforming to the designed inflated shape shown in FIG. 9.

EXAMPLE 8

A special fabric I-b obtained from the special fibers of Example 7 was laminated with the elastomer film 15 having a thickness of 300 $\mu$m through a hot press molding process to prepare a pair of laminated sheets. Next, the peripheries of these sheets were fused to obtain an air bag 16 conforming to the designed inflated shape shown in FIG. 9. The arrow direction A shown in FIG. 9 indicates the direction in which the air bag comes into contact with the face of the vehicle driver. The other arrow direction B indicates the direction in which the air bag inflates itself.

EXAMPLE 9

As shown in FIG. 8, a special fabric 17 (the special fabric II) composed of portions 17A made of elastic polyurethane fibers and crossed portions 17B made of high-modulus aramid fibers. Then the special fabric 17 was laminated with an elastomer film having a thickness of 300 $\mu$m by a hot press molding process to obtain an air bag 18 or 19 having the designed inflated shape as shown in FIGS. 10 and 11, respectively.

An air bag was also prepared by the same manner as above except the elastic fibers were replaced by the special fibers of Example 7 to constitute the portions 7A. The air bag produced also proved to be quite satisfactory in all the performance characteristics.

EXAMPLE 10

Figure 10:
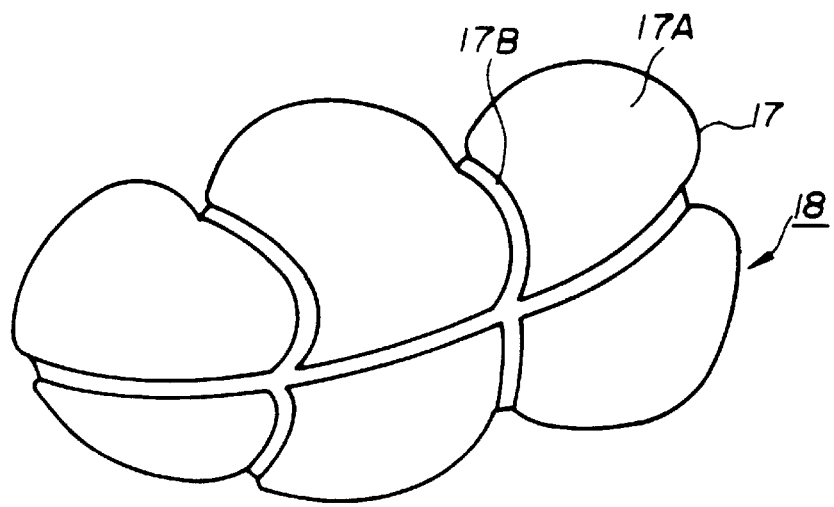
Figure 11:
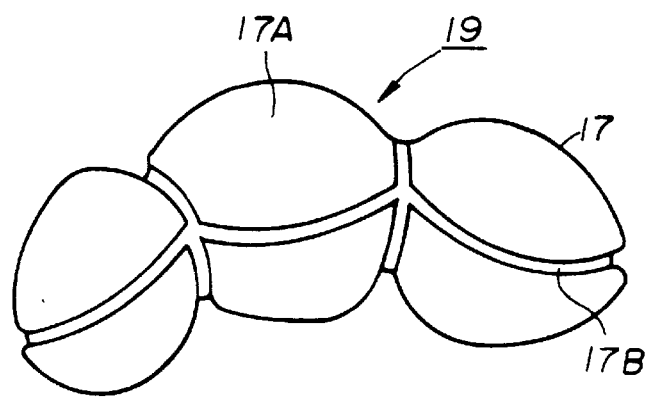
Figure 12:
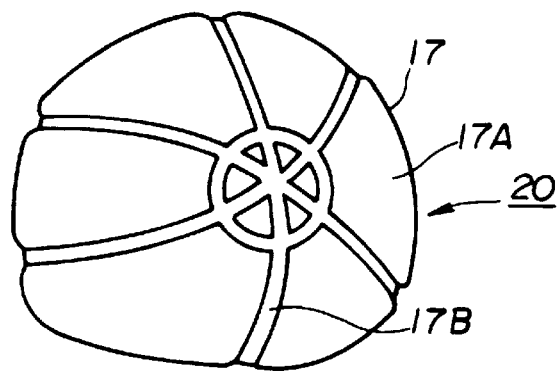

By laminating an elastic fabric and a high-modulus fabric and then laminating an elastomer film thereto, air bags 18, 19 and 20 shown in FIGS. 10 to 12 were prepared by the same method as in Example 9, respectively. Those air bags 18 and 19 are available for protecting passengers on those seats adjoining the driver's seat. The air bag 20 is available for protecting the driver.

Those air bags of Examples 8 to 10 respectively had a light weight and were precisely inflated. All the air bags were compactly stored in the module and manufactured very easily.

As is apparent from the above description, the invention provides such an ideal air bag having satisfactory performance capable of securely protecting the vehicle driver (and passengers) and smoothly inflating itself, and further having satisfactory compatibility for storage in a module and light weight. Furthermore, the air bag of the invention can be designed in a sufficient freedom manner, and manufacturers easily at an inexpensive cost.

We claim:

1. An air bag comprising: an airtight upper sheet and an airtight lower sheet, the peripheries of both sheets being connected, said airtight upper and lower sheets prepared by weaving a composite fiber composed of a filament core and a thermoplastic polymer bonded thereto which has a melting point at least 100° C. lower than that of said filament core, and then heat pressing and fusing said thermoplastic polymer so that the melted thermoplastic polymer enters the gaps between said filament cores to fill the gaps with a continuous thermoplastic polymer layer, said airtight upper and lower sheets each having said continuous thermoplastic polymer layer being overlapped to fuse the peripheries thereof together.

2. The air bag of claim 1 wherein the composite fiber is a sheath-and-core type composite fiber in which the filament core is covered with the thermoplastic polymer.

3. The air bag of claim 1 wherein the composite fiber is a side-by-side type composite fiber in which the filament core and the thermoplastic polymer are bonded together in parallel.

4. The air bag of claim 1 wherein the filament core is selected from polyamide fiber, polyester fiber, aramid fiber, aromatic polyester fiber and ultra-high-molecular-weight polyethylene fiber.

5. The air bag of claim 1 wherein the thermoplastic polymer has a melting point lower than that of the filament core so that the difference of melting point between the polymer and the core is 100° C. or more.

6. The air bag of claim 5 wherein the thermoplastic polymer is selected from polyethylene, modified (low-melting) polyester, polyurethane and ethylene-vinyl acetate copolymer.

7. An air bag comprising: a seamless air bag structure consisting of a thermoplastic or thermosetting elastomer membrane having a breaking extension of 100% to 1200% which is manufactured by a blow molding process or an injection molding process to shape said seamless bag without any sewing process.

8. The air bag of claim 7 wherein said membranous material is formed into an air bag having a thickness of 10 to 700 $\mu$m by a blow molding process or an injection molding process.

9. The air bag of claim 7 wherein said membrane is a laminated structure of at least two thermoplastic elastomer films or thermosetting elastomer films.

10. An air bag comprising a seamless air bag structure consisting of an elastomer-impregnated fabric or knit having a breaking extension of 100% to 1200% which is manufactured by the process of enveloping an air bag-shaped mold with an air bag-shaped stretch fabric or knit composed of elastic fibers having a breaking extension of 100% to 1200%, immersing the stretch fabric or knit/enveloping the mold in a liquid containing thermoplastic elastomer or thermosetting elastomer capable of forming a film having a breaking extension of 100% to 1200%, and then drying the elastomer-impregnated fabric or knit to shape said seamless bag without any sewing process.

11. The air bag of claim 10 which is prepared by forming a sheet having a thickness of 10 to 700 μm and a breaking extension of at least 100%, fusing vulcanizing or bonding the peripheries of two sheets thus obtained to form the air bag.

12. An air bag comprising: an air bag structure consisting of a pair of thermoplastic or thermosetting elastomer sheets having a breaking extension of 100% to 1200% manufactured by fusing, vulcanizing or bonding the peripheries of the two sheets to shape a bag without any sewing process.

13. The air bag or claim 12 wherein said sheet is a composite or laminated sheet consisting of at least two thermoplastic or thermosetting elastomer films.

14. The air bag or claim 12 wherein said sheet is reinforced with a stretch fabric or knit having a breaking extension of 100% to 1200%.

* * * * *